W. F. RICHARDS & D. C. DAVIS.
DRAFT AND BUFFING GEAR.
APPLICATION FILED AUG. 2, 1915.
1,295,210.
Patented Feb. 25, 1919.
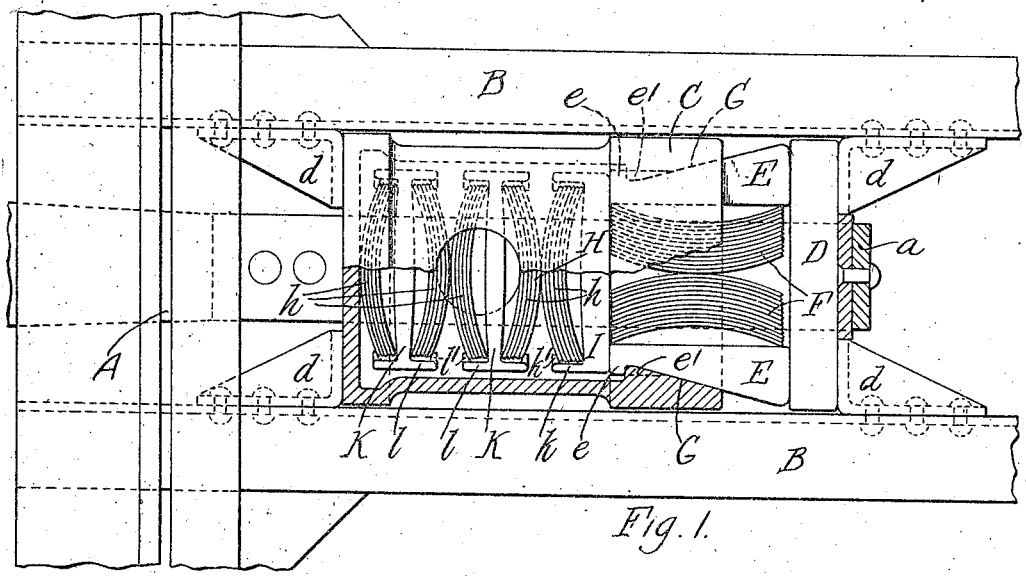
Fig. 1.
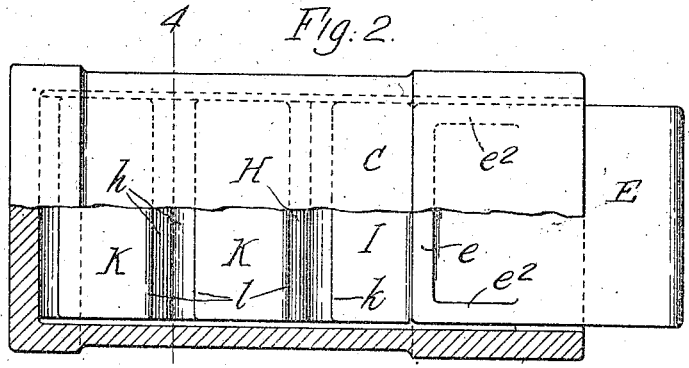
Fig. 2.
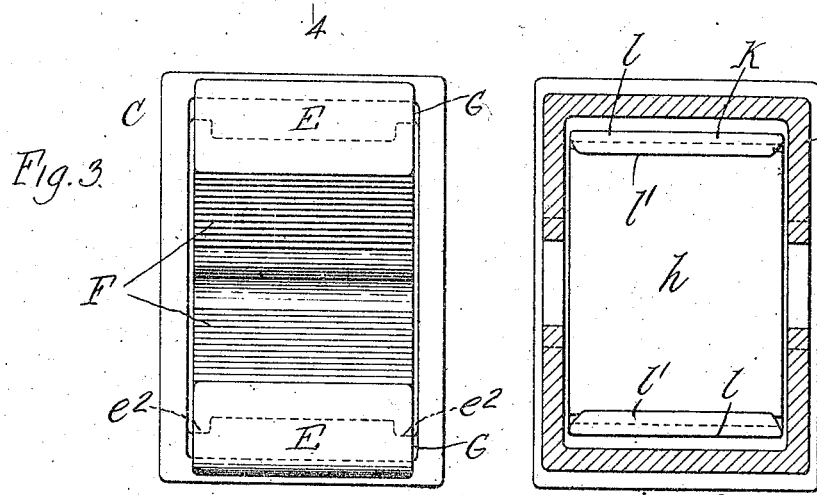
Fig. 3.
Fig. 4.
Inventors
Willard F. Richards
and Donald C. Davis.
by Wilhelm & Parker
Attorneys.

UNITED STATES PATENT OFFICE.

WILLARD F. RICHARDS, OF DEPEW, AND DONALD C. DAVIS, OF BUFFALO, NEW YORK, ASSIGNORS TO GOULD COUPLER CO., OF NEW YORK, N. Y.

DRAFT AND BUFFING GEAR.

1,295,210.   Specification of Letters Patent.   Patented Feb. 25, 1919.

Application filed August 2, 1915. Serial No. 43,058.

*To all whom it may concern:*

Be it known that we, WILLARD F. RICHARDS and DONALD C. DAVIS, citizens of the United States, residing at Depew and Buffalo, respectively, in the county of Erie and State of New York, have invented a new and useful Improvement in Draft and Buffing Gears, of which the following is a specification.

This invention relates to that type of friction draft and buffing gears for railway rolling stock in which the friction that resists the movement of the drawbar or movable element is produced by friction or wedge blocks having inclined friction faces which are movable against relatively stationary coöperating friction faces with which they are held in frictional contact by spring pressure. It is possible to secure very great capacity in such friction draft and buffing gears but where the friction elements are organized to produce great resistance, very strong springs are necessary to release or return the frictional elements to their normal position, and coil springs are not ordinarily feasible for this purpose where it is desired to secure a long travel of the drawbar or movable element. While a long travel of the drawbar or movable element can be obtained with one or more coil release springs, the strength of the spring is not increased by increasing its length and the available space possible for the release spring in the draft and buffing gear does not admit of the use of springs of large enough diameter to properly release the friction elements when the friction is very great.

The object of the invention is to provide an efficient draft and buffing gear of simple, practical and inexpensive construction which is adapted to give very great resistance with a long travel of the drawbar or movable element but which will nevertheless insure the proper releasing of the friction elements.

This is accomplished by employing in conjunction with the movable friction or wedge blocks and the coöperating springs which produce the friction for resisting the movement of the drawbar or movable element, a releasing spring composed of spring plates or leaf springs which are arranged in a novel manner such as to permit the required travel of the drawbar or movable element and produce the necessary power for releasing the friction elements.

In the accompanying drawings:

Figure 1 is a plan view partly in section of a draft and buffing gear embodying the invention, showing the same in place between the draft and buffing sills of a car.

Fig. 2 is a side elevation, partly in section, on an enlarged scale, of the draft and buffing gear removed from the car.

Fig. 3 is an elevation thereof.

Fig. 4 is a transverse sectional elevation thereof on an enlarged scale on line 4—4, Fig. 2.

A represents the drawbar or other movable draft or buffing element of a railway car which, as usual, is arranged to move endwise between draft and buffing sills B on the car or other piece of rolling stock and is provided with the usual yoke or strap *a* for connecting it to the draft and buffing gear.

The draft and buffing gear comprises a box or case C, arranged between the draft sills and adapted to bear at one end against fixed stops or abutments *c* on the sills; a follower D which is movable relative to the box or case C and is adapted to bear against fixed stops or abutments *d* on the draft sills; friction or wedge blocks E which are adapted to be forced lengthwise into the box or case C by the movement of the follower D in one direction or by the movement of the box or case C in the opposite direction; spring plates or leaf springs F which press the inclined faces of the wedge or friction blocks against coöperating inclined friction faces G in the box or case C, and a release spring H which is contained in the box or case C and is adapted to move the friction or wedge blocks outwardly or return them to their normal position. The draft and buffing gear with the exception of the construction and arrangement of the release spring may be of known construction. As shown, the friction or wedge blocks E are arranged with their thick ends projecting out of the open end of the box or case C and bearing against the follower D and with their inclined faces facing outwardly and bearing against the friction faces G, which are formed at the open end of the box or case C, and converge inwardly, the wedge blocks being pressed into frictional contact with these faces by the leaf springs or spring plates F which are arranged between the wedge or friction blocks. The friction or wedge blocks are provided at their inner ends with outwardly facing lips or flanges $e$ which are adapted to engage inwardly projecting shoulders $e'$ in the box or case at the inner ends of the friction faces G for retaining the wedge blocks in position in the open end of the box or case. The wedge blocks are also provided at the opposite edges of their inner end portions with longitudinal strengthening ribs $e^2$, Fig. 2, which occupy longitudinal grooves in the walls of the box or case C at the opposite edges of the friction faces G.

The gear operates in a well known manner. When the drawbar A is pulled outwardly, the follower D is moved by the yoke $a$ and shoves the friction or wedge blocks into the box or case, which is held stationary by the stops or abutments $c$, and the inclined friction faces G cause the friction blocks to move toward each other, thus compressing the interposed leaf springs F. When the draft on the drawbar is released the parts are returned to their normal position with the follower D against the stops or abutments $d$, by the release spring H, which exerts an outward pressure against the inner ends of the friction or wedge blocks. When the drawbar is moved in the opposite direction or inwardly in buffing, the follower D is held stationary against the stops or abutments $d$ and the box or case C is forced inwardly toward the follower by the drawbar which bears at its inner end against the end of the box or case C, and the friction faces G on the box or case C cause the friction or wedge blocks to move toward each other against the resistance of the interposed leaf springs F. When the pressure is released the box or case is again returned to its normal position against the stops or abutments $d$ by the release spring H.

The release spring H is composed of a plurality of groups $h$ of bowed spring plates or leaf springs arranged crosswise in the box or case C with the springs of adjacent groups arranged oppositely, that is, with the concaved faces of the springs of one group facing in the opposite direction from the corresponding faces of the spring plates in the next group. The groups of spring plates $h$ are retained in position in the box or case C by retainers which are movable lengthwise in the box or case C. As shown, there are five groups $h$ of the release springs arranged in a single retainer I and two double retainers K. The single retainer preferably consists of a substantially U-shaped metal piece or casting having a web or plate which extends crosswise in the box or case C with its outer face bearing against the inner ends of the friction blocks E and the interposed springs F, and end flanges $k$ projecting from one side thereof between which the first group of springs is retained by inwardly projecting lips $k'$ on the end flanges of the retainer. Each of the double retainers preferably consists of an I-shaped metal piece or casting having a web or plate which extends crosswise in the box or case parallel with the retainer I and is provided at each end with flanges $l$ which extend in opposite directions from the web. One group of spring plates is retained between the end flanges at each side of the retainer by lips $l'$ on the end flanges. The convexed side of the group of spring plates in the single retainer bears against the convexed side of the next group of spring plates in the first double retainer, while the groups of plates between the two double retainers bear against each other in a similar manner and the convexed side of the last group of plates bears against the closed end of the box or case. The webs of the retainers K and L are preferably made with convexed faces to prevent the spring plates from being strained so as to become set.

Manifestly a pair of single retainers similar to the retainer I and arranged back to back could be used in place of the double retainers, but the double retainers are preferred as they reduce the number of parts and occupy less space. The retainers could be of any other suitable form adapted to retain the spring plates in the oppositely arranged groups in the box or case and prevent the ends of one group of plates from slipping by the ends of the next group, as would be apt to happen with groups arranged end to end without the retainers between them. The groups of spring plates can be easily arranged in the retainers before the latter are placed in the box or case C and the retainers prevent the springs from being assembled in the gear incorrectly. By arranging the release spring plates in groups in the manner described, it is possible to obtain a three and one half inch travel of the drawbar in a draft and buffing gear of standard dimensions and yet insure the release of the friction elements of a gear of three hundred thousand to three hundred and twenty-five thousand pounds capacity.

The spring plates of the release spring H can be and preferably are of the same dimensions as the resistance spring plates F, thus enabling all of the spring plates of the gear to be alike.

This invention has been described above in connection with a combined draft and buffing gear, but the same release spring arrangement and the same combination thereof with the friction elements could be employed in a gear used to resist either draft or buffing strains alone.

We claim as our invention:—

1. The combination with a movable element, of a box, a friction block adapted to be moved longitudinally in said box by the movement of said movable element, a friction face in said box, a spring which presses said friction block and face into contact for resisting the movement of said movable element, and means for releasing said friction block comprising a plurality of groups of spring plates arranged crosswise in said box with adjacent groups facing in opposite directions and retainers which retain said spring plates in said groups and in said relative arrangement and which extend crosswise in said box and are movable longitudinally therein.

2. The combination with a movable element, of a box, friction blocks adapted to be moved longitudinally in said box by the movement of said movable element, friction faces in said box which contact with said friction blocks and cause the blocks to move laterally toward each other, spring plates which are arranged lengthwise between said friction blocks and press said friction blocks and faces into contact for resisting the movement of said movable element, and means for releasing said friction block, comprising a plurality of groups of spring plates arranged crosswise in said box with adjacent groups facing in opposite directions, and retainers which retain said spring plates in said groups and in said relative arrangement in the box.

3. The combination with a movable element, of coöperating friction members one of which is adapted to be moved relative to the other by the movement of said movable element, a spring which presses said friction members into contact for resisting the movement of said movable element, means for returning the movable friction member to normal position after movement thereof by said movable element comprising a plurality of groups of spring plates, and relatively movable retainers in which said groups of spring plates are contained and with which they move.

4. The combination with a movable element, of coöperating friction members one of which is adapted to be moved relative to the other by the movement of said movable element, a spring which presses said friction members into contact for resisting the movement of said movable element, means for returning the movable friction member to normal position after movement thereof by said movable element comprising a plurality of groups of spring plates, and relatively movable retainers for the groups of spring plates which are provided with end flanges between which the spring plates are held.

5. The combination with a movable element, of coöperating friction members one of which is adapted to be moved relative to the other by the movement of said movable element, a spring which presses said friction members into contact for resisting the movement of said movable element, and means for releasing the movable friction member comprising a plurality of groups of spring plates, a U-shaped retainer in which one end group of spring plates is contained, and an I-shaped retainer in which two adjacent groups of spring plates are contained.

6. The combination with a movable element, of coöperating friction members one of which is adapted to be moved relative to the other by the movement of said movable element, a spring which presses said friction members into contact for resisting the movement of said movable element, and means for releasing said movable friction member comprising a plurality of groups of spring plates, retainers in which the end groups of spring plates are confined, and an I-shaped retainer in which two adjacent intermediate groups of spring plates are contained.

Witness our hands this 29 day of July, 1915.

WILLARD F. RICHARDS.
DONALD C. DAVIS.

Witnesses:
ALLEN B. BRIMMER,
GEORGE E. HAMMOND.